(12) United States Patent
Halasz (10) Patent No.: US 7,039,068 B1
(45) Date of Patent: May 2, 2006

(54) PACKET ASSEMBLY

(75) Inventor: David E. Halasz, Stow, OH (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 09/964,039

(22) Filed: Sep. 26, 2001

(51) Int. Cl.
   *H04J 3/26* (2006.01)
(52) U.S. Cl. ...................... 370/473; 370/428
(58) Field of Classification Search .......... 370/428, 370/473, 465, 468, 470, 232, 234, 252–253, 370/474, 300
See application file for complete search history.

(56) References Cited

U.S. PATENT DOCUMENTS 5,199,027 A * 3/1993 Barri ..................... 370/231
5,327,421 A * 7/1994 Hiller et al. ........... 370/395.61
2002/0154602 A1 * 10/2002 Garcia-Luna-Aceves et al. 370/230
2002/0196787 A1 * 12/2002 Rajan et al. ............. 370/393

OTHER PUBLICATIONS

IEEE publication "Scaling CSMA/CD to 1 Gb/s with frame bursting", Molle, M., Kalkunte, M., Kadambi, J. Local Computer Networks, 1997.*
Jean Tourrilhes; Packet Frame Grouping: Improving IP Multimedia Performance Over CSMA/CA; pp. 1-6.

* cited by examiner

*Primary Examiner*—Seema S. Rao
*Assistant Examiner*—Salman Ahmed
(74) *Attorney, Agent, or Firm*—Tucker Ellis & West (57) ABSTRACT

A dynamic packet consolidation algorithm for a wireless transmission regime. At least first and second packets of a plurality of packets are sampled. The respective throughput times of each first and second packet are then calculated. The first and second packets are consolidated into a third packet if the sum of the corresponding throughput times exceeds a predetermined limit.

16 Claims, 5 Drawing Sheets

PACKET ASSEMBLY

BACKGROUND OF THE INVENTION

1. Technical Field of the Invention

This invention is related to data packet structures, and more particularly, to dynamic restructuring of packets in a wireless regime.

2. Background of the Art

Wireless networks (WLANs) are on the verge of becoming a mainstream connectivity solution for a wide range of customers. The IEEE 802.11 standard set guidelines for data rates (1 and 2 Mbps) that were too slow for most business requirements. The recently ratified IEEE 802.11b standard increases the data rates to 5.5 Mbps and 11 Mbps attracting renewed interest in the wireless network market. However, at this juncture, the most pressing issue associated with WLANs has been the limited throughput.

Wireless networks are not as efficient as 802.3 Ethernet networks when operating with small packet sizes. This is due in part to radio headers and collision back-off algorithms. However, in an IEEE 802.11 and 802.11b wireless LAN regime, varying packet sizes are allowed such that packets can be constructed to that which are larger than utilized in an 802.3 Ethernet environment. Thus where a station is sending more than one packet to a given destination, which occurs, for example, between bridging devices, transmission efficiency can be significantly increased by restructuring these packets into a larger single packet before transmission over the wireless medium. When this "jumbo" packet is received at the destination, it can then be disassembled.

What is needed is an architecture that dynamically restructures the packets such that throughput is increased.

SUMMARY OF THE INVENTION

The present invention disclosed and claimed herein, in one aspect thereof, comprises a dynamic packet consolidation algorithm for a wireless transmission regime. At least first and second packets of a plurality of packets are sampled. The respective throughput times of each of the first and second packets are then calculated. The first and second packets are consolidated into a third packet if the sum of the corresponding throughput times exceeds a predetermined limit.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

The disclosed architecture is particularly suited for air protocols, and more particularly for wireless bridges which send packet traffic to the same destination.

Figure 1:
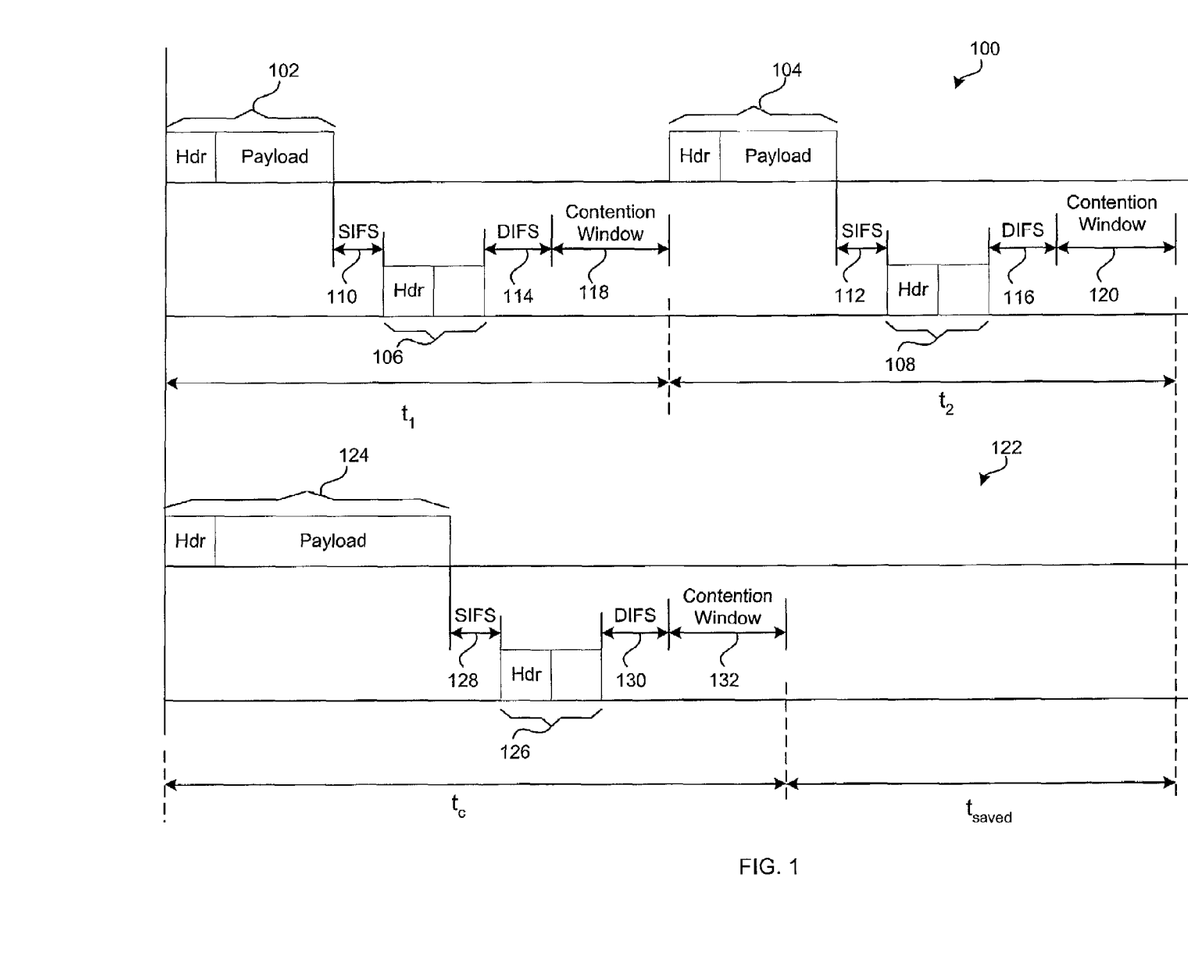
FIG. 1 illustrates a graphical comparison of a conventional smaller packet structure and the resulting larger consolidated data packet structure when processed in accordance with the disclosed algorithm.

Referring now to FIG. 1, there is illustrated a graphical comparison of a conventional smaller (or short) packet structure and the resulting larger (or long) consolidated data packet structure when processed in accordance with the disclosed algorithm. Packets having either long or short headers are described in the IEEE 802.11b standard. Packets having long and short headers are used herein to describe the packet assembly architecture. A packet sampler samples at least a first packet and a second packet for processing by a processing device. A first part of the graph illustrates a first packet stream 100 that includes two smaller packets 102 and 104 which have been sampled, and contain respective acknowledgment (ACK) signals 106 and 108. Each packet 102 and 104 is followed by a corresponding short interframe spaces (SIFS) period 110 and 112, and each ACK signal 106 and 108 is followed by respective distributed interframe spaces (DIFS) period 114 and 116 and contention window periods 118 and 120. The xIFSs times are mandatory periods of idle time and are used to control event priorities. Correct receipt of packets is signaled through ACK packets; an ACK packet should be returned SIFS seconds after successful reception of a packet. A second part of the graph illustrates the resulting larger consolidated frame 122 having a data packet 124, followed by the corresponding ACK signal 126, and interspersed with a SIFS 128, a DIFS 130 and a contention window 132.

In this particular example, the data packets 102 and 104 are each 200-byte packets having corresponding headers. The amount of time it takes to transmit a 200-byte IEEE 802.11b packet, using long headers, at 11 Mbps, is approximately 337 microseconds. The amount of time it takes to transmit a 400-byte IEEE 802.11b packet and header, using long headers, at 11 Mbps, is approximately 482 microseconds. In this case, approximately 145 microseconds is saved when consolidating the smaller data packets 102 and 104 according to the disclosed algorithm. Note that these transmit times can programmed into a look-up table for fast reference by a processor when making a determination as to when packet consolidation will occur. Alternatively, the approximated or estimated times can be calculated in substantially real time by a high-speed processor such that packet delay is minimized, if it exists at all. Thus it is more efficient to transmit a larger packet 124 than two smaller packets 102 and 104. This time savings includes a reduction in the time associated with the SIFS, ACK signal, DIFS, and contention windows, since only one large data packet 124 will be sent instead of the two smaller packets 102 and 104. Note that time is required to assemble and disassemble the larger packet 124, and is also a factor considered when determining to consolidate smaller packets. The total time to assemble and ship a packet is defined as the throughput time, which throughput time (in bits/time) is defined to be data packet time+SIFS time+ACK time+DIFS time+average Back-off time. Thus the consolidated packet needs to be made sufficiently large so that the time saved exceeds the time to assemble/disassemble the large packet.

The following relationship is utilized to determine when packet consolidation can be performed. Let $t_1$=throughput time for a first small packet 102; let $t_2$=throughput time for a second small packet 104; and let $t_c$=throughput time for the consolidated packet (A+B). Packet consolidation will occur automatically when $t_1+t_2>t_c$, that is, when the time it takes to assemble, transmit, and disassemble the larger packet 124 is less than the time it takes to assemble, transmit, and disassemble both of the smaller packets 102 and 104. The resulting time saved by utilizing the disclosed packet consolidation algorithm is then represented as $t_{save}$. In application, the user can define consolidation limits such that automatic packet assembly will not occur until the predetermined limit is exceeded. For example, a limit may be set to 10% wherein if consolidation of two smaller packets does not result in a savings in throughput of at least 10%, consolidation will not occur. Note that the disclosed consolidation architecture is not limited to consolidating only two packets, but can be extended to three or more packets insofar as the consolidated throughput time $t_c$ is less than the combined throughput times of the individual packets.

Figure 2:
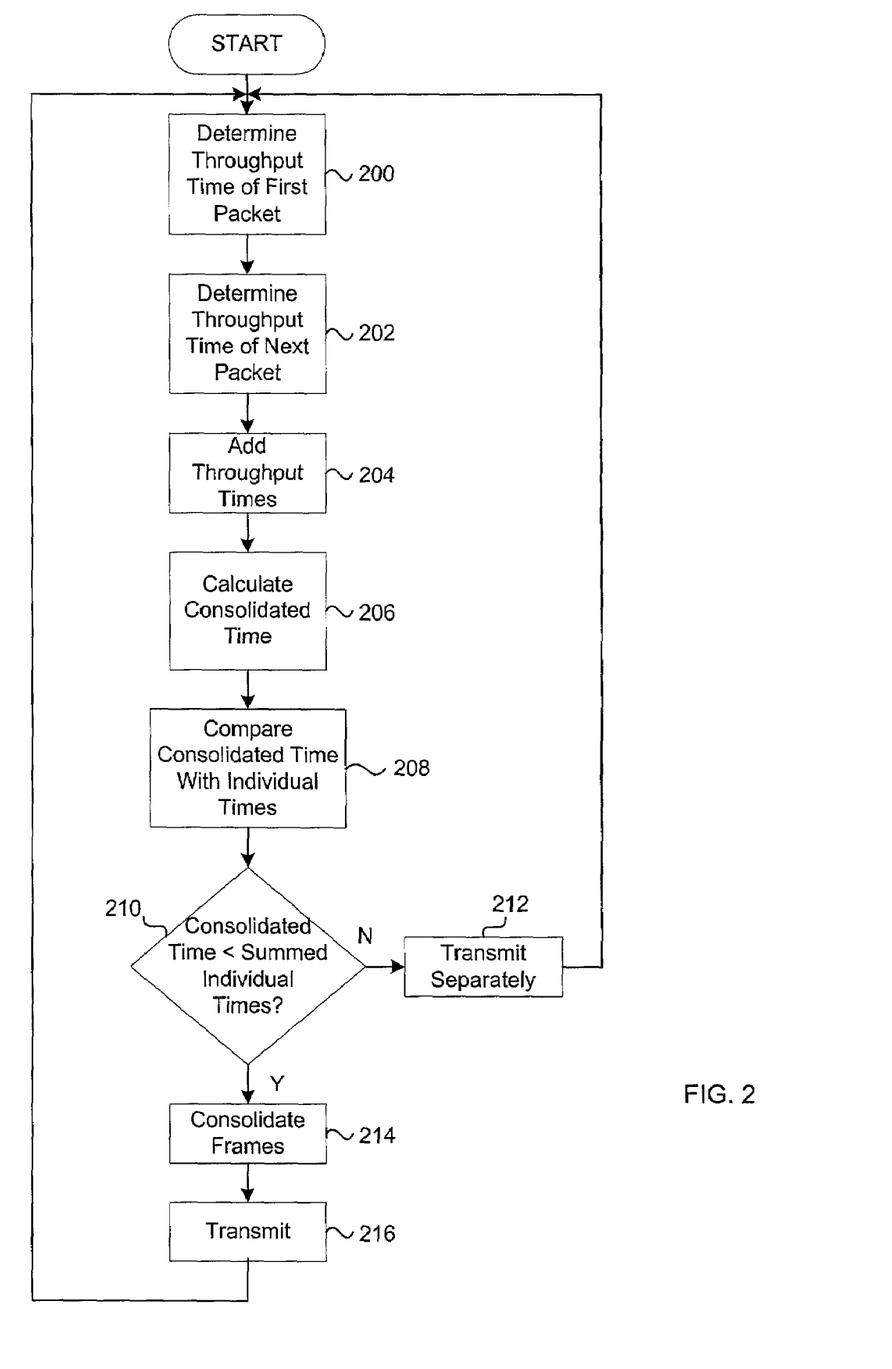
FIG. 2 illustrates a flow chart of the process for determining when smaller data packets will be consolidated into a larger packet in accordance with the disclosed algorithm.

Referring now to FIG. 2, there is illustrated a flow chart of the process for determining when smaller data packets will be consolidated into a larger packet in accordance with the disclosed algorithm. The process begins at a Start block and flows to a function block 200 to determine the throughput time of a first smaller packet 102. Flow is then to a function block 202 to determine the throughput time of a second smaller packet 104. The throughput times of the first and second packets 102 and 104 are then added, as indicated in a function block 204. In a function block 206, the throughput time of the consolidated packet is then calculated. The throughput times of the consolidated packets are then compared, in a function block 208, against the sum of the individual throughput times of the first and second packets 102 and 104. Flow is then to a decision block 210 to make the comparison. If the consolidated throughput time is not less than the summed individual times, flow is out the "N" path to a function block 212 to maintain the existing separate packet structures, and to separately transmit the smaller packets 102 and 104 accordingly. Flow then loops back to the input of function block 200 to then process the next set of frames. However, if the consolidated throughput time is less than the summed individual times, flow is out the "Y" path to a function block 214 to then restructure the smaller individual packets 102 and 104 into the consolidated packet 124. The consolidated frame is then transmitted accordingly, as indicated in a function block 216. Flow then loops back to the input of function block 200 to process the next frames.

Figure 3:
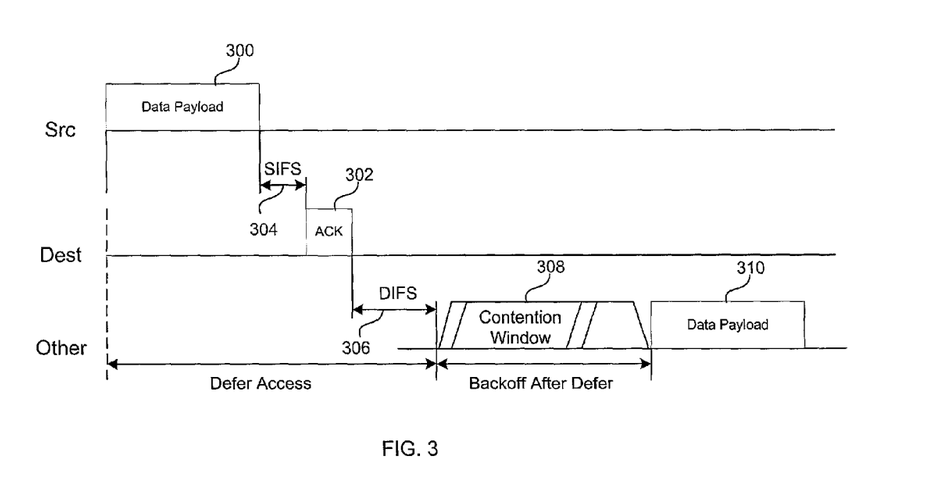
FIG. 3 illustrates a timing diagram for a directed-data packet with a long header, according to a disclosed embodiment.

Referring now to FIG. 3, there is illustrated a timing diagram for a directed-data packet with long header, according to a disclosed embodiment. The basic method for IEEE 802.11 is the Distributed Coordination Function (DCF) which uses Carrier Sense Multiple Access/Collision Avoidance (CDMA/CA), and which requires that each station may transmit only if the channel is idle. However, if the channel is busy, each station waits until channel activity ceases, and then enters into a random back-off procedure. This back-off procedure prevents multiple stations from attempting to seize the transmission channel immediately after the preceding transmission has completed. When the Source (Src) transmits a data payload 300 after a preceding DIFS period, the Destination (Dest) responds with an acknowledgment signal (ACK) 302 after a short SIFS period 304. Packet reception in DCF requires an ACK signal 302. The period between completion of the packet transmission and start of the ACK signal 302 is one SIFS period. The IEEE 802.11 standard requires that ACKs are to be handled at the MAC layer, the MAC layer offering fast ACKs by giving ACK frames a higher priority than other traffic. Transmissions other than ACK signals 302 must wait at least one DIFS signal 306 before transmitting data. If a transmitter senses a busy medium, it determines a random back-off period 308 by setting an internal timer to an integer number of slot times. Upon expiration of the DIFS signal 306, the timer begins to decrement. If the timer reaches zero, the station may begin transmission. However, if the channel is seized by another station before the timer reaches zero, the timer setting is retained at the decremented value for subsequent transmission. In this particular embodiment utilizing packetized data with a long header, the throughput time (in bits/time) is defined to be data packet time+SIFS time+ACK time+DIFS time+average Back-off time.

Figure 4:
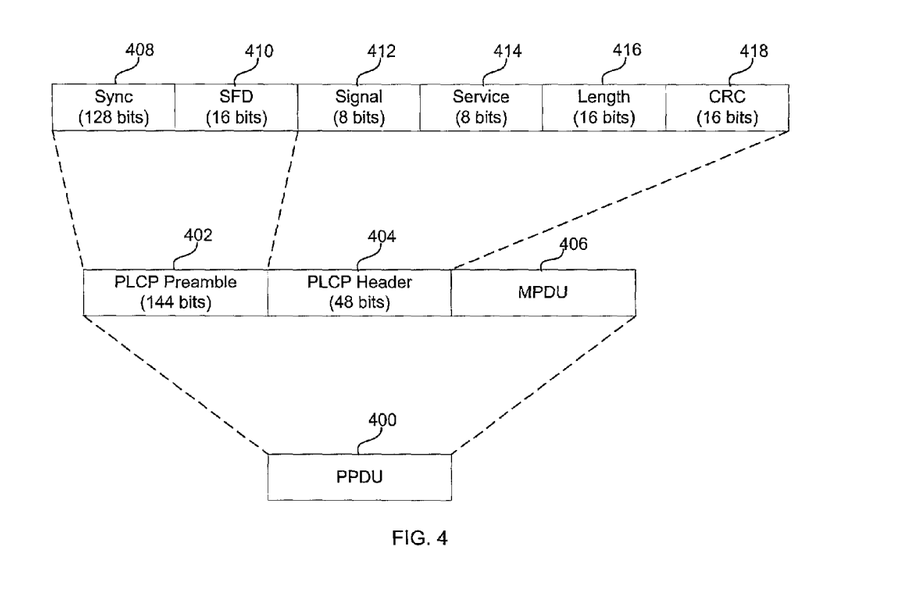
FIG. 4 illustrates a structure of a PHY preamble and long header, according to a disclosed embodiment.

Referring now to FIG. 4, there is illustrated a structure of a PHY preamble and long header, according to a disclosed embodiment. The PPDU (PLCP Protocol Data Unit) frame 400 provides for the asynchronous transfer of MAC sublayer MPDUs from any transmitter to all receiving stations within the wireless medium, and comprises a 144-bit PLCP (Physical Layer Convergence Protocol) Preamble 402, a 48-bit PLCP Header 404, and a MPDU (MAC Protocol Data Unit) 406. The PLCP Preamble 402 precedes the PLCP Header 404, which Header 404 is followed by the MPDU 406. The PLCP Header 402 is comprised of a 128-bit SYNC field 408 and a 16-bit SFD (Start Frame Delimiter) field 410. The SYNC field 408 consists of scrambled 1-bits, and is used for achieving synchronization with the receiver. The SFD field 410 follows the SYNC field, and indicates the start of the PHY dependent parameters within the PLCP Preamble 402.

The PLCP Header 404 comprises an 8-bit Signal field 412, followed by an 8-bit Service field 414, followed by a 16-bit Length field 416, and ending with a 16-bit CRC field 418. The Signal field indicates to the PHY the modulation that shall be used for transmission of the MPDU 406. The Service field 414 is a reserved field. The Length field 416 indicates the number of microseconds required to transmit the MPDU 406, and the CRC field 418 is the check field for the Signal, Service, and Length fields.

Figure 5:
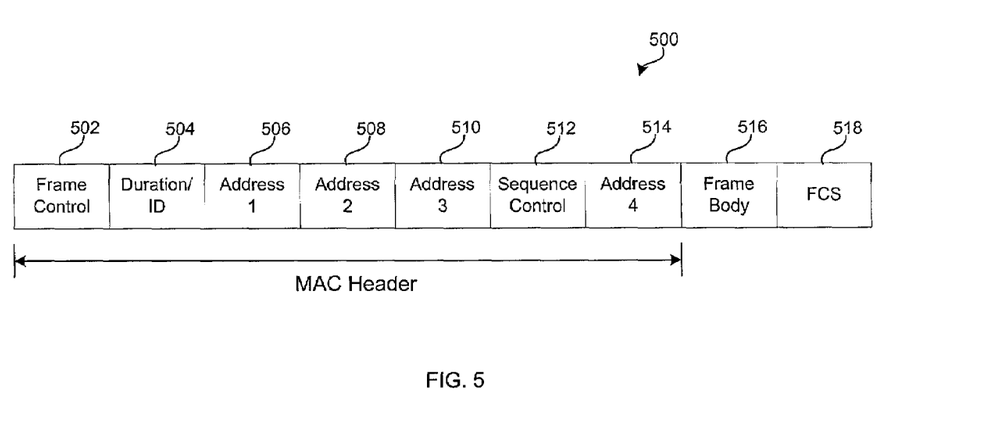
FIG. 5 illustrates a general structure of a MAC frame format.

Referring now to FIG. 5, there is illustrated a general structure of a MAC frame format. The MAC frame includes a MAC Header, a Frame Body, and a FCS field. The fields of the MAC frame 500 are ordered beginning with the MAC Header comprising a Frame Control field 502, Duration/ID field 504, Address-1 field 506, Address-2 field 508, Address-3 field 510, Sequence Control field 512, Address-4 field 514, Frame Body field 516, and Frame Check Sequence (FCS) field 518. The Frame Control field 502 is a 2-byte field and indicates the size of the address fields (506, 508, 510, and 514) and whether the frame 500 contains synchronous or asynchronous data, among other control information. The Frame Control field 502 has two type bits and four subtype bits that identify the frame (ACK, CTS, RTS, etc.), and also has (among other things) a power management bit. The Duration/ID field 504 is a 2-byte field which carries a duration value (in microseconds) as defined for each frame type. For frames transmitted during the contention-free period, the Duration/ID field 504 is set to 32768.

The MAC frame 500 contains four 6-byte address fields 506, 508, 510, and 514 which are used to indicate the BSSID (basic service set ID), source address, destination address, transmitting station address, and receiving address. Certain frames may not contain all of the address fields. The Sequence Control field 512 is a 2-byte field consisting of two sub-fields that identify the intended immediate recipient on the wireless medium for the information contained in the Frame Body field 516. The Frame Body field is a variable-length field of 0–2312 bytes and contains information specific to individual frame types and subtypes. The FCS field 518 is a 4-byte field containing a 32-bit CRC (Cyclic Redundancy Check) and is calculated for all fields of the MAC header and Frame Body field 516 at the receiver end. Note that the payload data (or frame body) is a variable length field of 0–2312 bytes.

Figure 6:
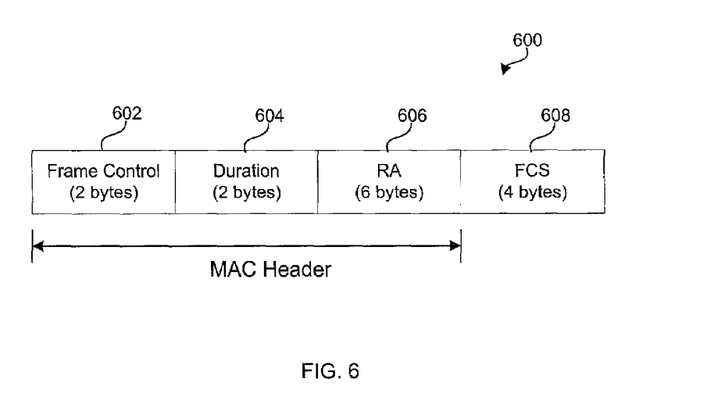
FIG. 6 illustrates the structure of a conventional acknowledgment frame format.

Referring now to FIG. 6, there is illustrated the structure of a conventional acknowledgment (ACK) frame format. The ACK frame 600 includes a MAC Header followed by a FCS field. The ACK frame 600 comprises four fields; a Frame Control field 602, a Duration field 604, an RA field 606, and the FCS field 608. The Frame Control field 602 is a 2-byte field having the similar function of the above Frame Control field 502. The Duration field 604 is a 2-byte field which carries a duration value as defined for each frame type. The RA field 606 is the address copied from the Address-2 field 508 of the directed data immediately preceding the ACK frame 600.

In an example associated with FIG. 3, where the data payload 300 contains 1,500 bytes of data being transmitted at the IEEE 802.11b rate of 11 Mbps, the bit/times are calculated as follows: (1500 bytes×8 bits/byte)/11 Mbps=1091·secs; the PHY Preamble and header bit time is 192·secs; and the data packet MAC header and CRC times are 20.36·secs; for a total of 1303.36·secs. The SIFS transmit time 304 to receiver is calculated at 10·secs. The ACK packet 302 enters in with a PHY Preamble and Header time of 192·secs (with 14 bytes being transmitted at 10.18·secs at the 11 Mbps rate). The DIFS and back-off times are calculated on a slot time of 20·secs, as follows: the DIFS time=2×Slot Time+SIFS time=50·secs; and the average back-off time involves the Contention Window (CW) time, and $=CW_{Max}/2\times Slot\ Time=32/2\times 20\cdot secs=320\cdot secs$. Thus the throughput time associated with the 1500-byte long header packet example is the Data Payload+SIFS+ACK+DIFS+Back-Off$_{AVE}$=1303.36+10+192+50+320=1875.36·secs.

Figure 7:
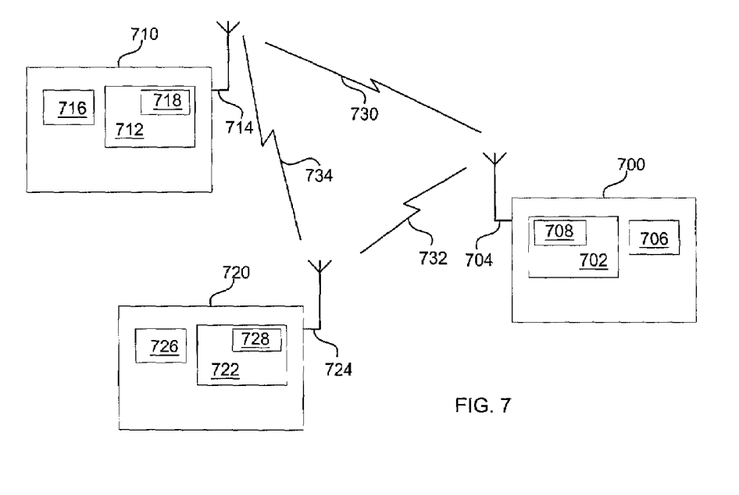
FIG. 7 illustrates an ad hoc mode of operation having multiple peer stations in a wireless regime utilizing the disclosed packet assembly architecture.

Referring now to FIG. 7, there is illustrated an ad hoc mode of operation having multiple peer stations in a wireless regime utilizing the disclosed packet assembly architecture. The ad hoc network topology does not use an access point station associated with an infrastructure embodiment of FIG. 8, but simply provides communication directly other the peer stations. A first wireless station 700 is a computer containing a wireless network interface card (NIC) 702 operable to accommodate wireless transmissions, and operatively connected to an antenna 704 for the communication of data between other wireless stations. The first station 700 also comprises a central processor 706 for control and processing of the station 700 functions. In this particular embodiment, the NIC 702 includes the disclosed packet algorithm programmed into packet logic 708 (e.g., a Digital Signal Processor) for high-speed packet processing away from the central processor 706. It can be appreciated that the packet algorithm could be embodied on a mass storage device or non-volatile memory such that the central processor 706 executes the packet algorithm therefrom.

A second wireless station 710 is substantially similar in structure to the first station 700 and, contains a second wireless NIC 712 operable to accommodate wireless transmissions, and operatively connected to a second antenna 714 for the communication of data between other wireless stations. The second station 710 also comprises a central processor 716 for control and processing of the station 710 functions. In this particular embodiment, the NIC 712 includes the disclosed packet algorithm programmed into packet logic 718 for high-speed packet processing away from the central processor 716. It can be appreciated that the packet algorithm could be embodied such that the central processor 716 executes the packet algorithm.

Similarly, a third wireless station 720 contains a third wireless NIC 722 operable to accommodate wireless transmissions, and operatively connected to a third antenna 724 for the communication of data between other wireless stations. The third station 720 also comprises a central processor 726 for control and processing of the station 720 functions. In this particular embodiment, the NIC 722 includes the disclosed packet algorithm programmed into packet logic 728 for high-speed packet processing away from the central processor 726. It can be appreciated that the packet algorithm could be embodied such that the central processor 726 executes the packet algorithm.

In operation, the first station 700 executes the packet algorithm to dynamically restructure packets when efficient to do so, and communicates both separate and consolidated packets to the second station 710 via a wireless signal 730, and the third station 720 via a wireless signal 732; the second station 710 executes the packet algorithm to dynamically restructure packets when efficient to do so, and communicates with the third station 720 via a wireless signal 734, and with the first station 700 via the wireless signal 730; and the third station 720 executes the packet algorithm to dynamically restructure packets when efficient to do so, and communicates with the second station 710 via a wireless signal 734, and the first station 700 via a wireless signal 732. Note that in accordance with the disclosed packet algorithm, data packets are transmitted and received among the various wireless stations in either the larger consolidated format or the standard smaller format. In this particular embodiment, ad hoc mode does not require that each station 700, 710, or 720 operate with the disclosed packet consolidation algorithm. In application, only one station may be running the algorithm such that it transmits the consolidated packets to peer stations that dissemble the received larger packets, yet transmit only standard packet sizes. This is counterproductive, however, in that enhanced throughput would only be achieved by one computer, thus in order to realize the most efficient throughput, most, if not all, of the wireless stations should contain the packet algorithm. Note also that the disclosed is not limited to three wireless stations, as illustrated herein, but is operable with a large number of wireless stations. Further, the wireless station 700 may be a computer of any model, e.g., portable, desktop, server, etc. The wireless NIC 708 may be an 802.11 PC Card, a PCI card, ISA card, NIC functions which are embedded into motherboards, or any other interface function.

Figure 8:
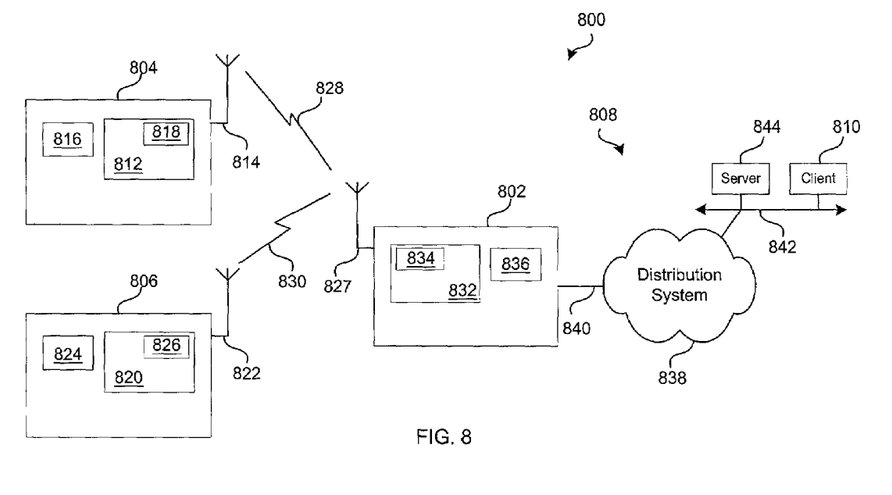
FIG. 8 illustrates an infrastructure mode of operation having multiple peer stations in wireless communication with an access point.

Referring now to FIG. 8, there is illustrated an infrastructure mode of operation having multiple peer stations in wireless communication with an access point (AP). In the infrastructure network topology, a wireless network 800 comprises at least one AP station 802 connected to the network, and a set of wireless stations, e.g. a first station 804 and a second station 806. The primary function of the AP station 802 is to form a bridge between the wireless stations (804 and 806), and a wired LAN (Local Area Network) 808. When the AP station 802 is present, the wireless stations (804 and 806) do not communicate on a peer-to-peer basis-all communications between the wireless stations (804 and 806), or between stations (804 and 806) and a wired LAN client 810 go through the AP station 802. Since most WLANs 800 require access to a wired LAN 808 for available services (e.g., printers, file servers, Internet links, etc.), such WLANs are configured in the infrastructure mode.

In the disclosed embodiment, the first station 804 (similar to the first station 700) contains a wireless NIC 812 operable to accommodate wireless transmissions, and operatively connected to a first antenna 814 for the communication of data between other wireless stations. The first station 804 also comprises a central processor 816 for control and processing of the first station 804 functions. In this particular embodiment, the NIC 812 includes the disclosed packet algorithm programmed into packet logic 818 for high-speed packet processing away from the central processor 816. It can be appreciated that the packet algorithm could be embodied in peripheral storage such that the central processor 816 executes the packet algorithm after extraction therefrom.

The second wireless station 806 (similar to the second station 710) contains a second wireless NIC 820 operable to accommodate wireless transmissions, and operatively connected to a second antenna 822 for the communication of data between other wireless stations. The second station 806 also comprises a central processor 824 for control and processing of the second station 806 functions. In this particular embodiment, the NIC 820 includes the disclosed packet algorithm programmed into packet logic 826 for high-speed packet processing away from the central processor 824. It can be appreciated that the packet algorithm could be embodied in peripheral storage such that the central processor 824 executes the packet algorithm after extraction therefrom.

The AP 802 acts as a bridge between the wireless stations (804 and 806) and wired networks, and usually consists of a radio frequency transmitter for the wireless transmission of packets utilizing an antenna 827 via a signal 828 with the first station 804, and via a signal 830 with the second station 806. In this particular embodiment, the AP station 802 also comprises a NIC 832 that interfaces to the antenna 827. The NIC 832 also comprises processing logic 834 for high-speed processing of the disclosed packet algorithm when transmitting packets to the remote wireless stations (804 and 806). The AP station 802 also comprises a central processor 836 that communicates with the NIC 832 to facilitate operation of all functions provided by the AP station 802, and is operable to execute the disclosed packet algorithm. As mentioned hereinabove, the algorithm may be stored in a peripheral storage device or in non-volatile memory such that the processor 836 may retrieve the algorithm for execution. Similarly, the algorithm may be stored in non-volatile memory on the NIC 832 and executed solely by the processing logic 834 upon retrieval therefrom.

The AP station 802 acts as the bridge device from the wireless environment to the LAN 808 such that the AP station 802 interfaces to a distribution system 838 via a connection 840. The distribution system 838 may, in itself, be a global communication network such as the Internet, but may also be a local hardwired network, or any other conventional distribution architecture. The distribution system 838 connects to a LAN medium 842 to provide access to one or more clients 810, one or more servers 844, or any other devices or clients connected thereto.

In operation, the AP station is operable to transmit and receive standard and consolidated packets in accordance with the disclosed embodiments. Packets destined for the LAN 808 may be structured for conventional IEEE 802.3 packets, Token Ring packets, or other conventional protocols. Similarly, packets received by the AP 802 from the LAN 808 can be processed dynamically from any conventional network architecture for consolidation and transmission where determined to be more efficient to do so.

The IEEE 802.11 standard discusses larger packet sizes, but that is due to accommodating media which use larger packet sizes, e.g., Token Ring. The disclosed algorithm can be used in other wireless applications that use variable packet sizes. For example, cell phones, pagers, wireless PDA devices, etc., may incorporate the disclosed architecture where it is desired to do so.

In an alternative embodiment, it can be appreciated that the disclosed algorithm for dynamically determining to reconstruct packets before transmission can be embodied in a chip, such as a Field Programmable Gate Array (FPGA), signal processor, or other types of devices for fast execution of the algorithm.

Although the preferred embodiment has been described in detail, it should be understood that various changes, substitutions and alterations can be made therein without departing from the spirit and scope of the invention as defined by the appended claims.

What is claimed is:

1. A method of packet assembly in a wireless transmission system, comprising the steps of:
   sampling at least first and second packets of a plurality of packets;
   calculating corresponding throughput times for each of said first and second packets; and
   consolidating said first and second packets into a third packet if the sum of said corresponding throughput times exceeds a predetermined limit.

2. The method of claim 1, wherein said predetermined limit is a throughput time of said third packet in the consolidating step.

3. The method of claim 1, wherein a throughout time of said third packet is less than the sum of said corresponding throughput times of said first and second packets.

4. The method of claim 1, wherein said corresponding throughput times includes an assembly time and a disassembly time of said packet.

5. The method of claim 1, wherein said corresponding throughput times includes a data packet time, a Short InterFrame Space time, a Distributed InterFrame Space time, and an average back-off time of said corresponding packet.

6. The method of claim 1, wherein the step of consolidating is performed in an ad hoc network topology.

7. The method of claim 1, wherein the step of consolidating is performed in an infrastructure network topology.

8. The method of claim 1, wherein more than two packets are sampled in the step of sampling and consolidated into a consolidated packet in the step of consolidating when the sum of said corresponding throughput times exceeds said predetermined limit.

9. A packet assembly apparatus in a wireless transmission system, comprising:
   a sampler for sampling at least first and second packets of a plurality of packets; and
   a processor for calculating corresponding throughput times for each of said first and second packets;
   wherein a third packet is generated by consolidating said first and second packets if the sum of said corresponding throughput times exceeds a predetermined limit.

10. The apparatus of claim 9, wherein said predetermined limit is a throughput time of said third packet.

11. The apparatus of claim 9, wherein a throughput time of said third packet is less than the sum of said corresponding throughput times of said first and second packets.

12. The apparatus of claim 9, wherein said corresponding throughput times includes an assembly time and a disassembly time of said packet.

13. The apparatus of claim 9, wherein said corresponding throughput time includes a data packet time, a Short InterFrame Space time, a Distributed InterFrame Space time, and an average back-off time of said corresponding packet.

14. The apparatus of claim 9, wherein consolidation of said first and second packets is performed in an ad hoc network topology.

15. The apparatus of claim 9, wherein consolidation of said first and second packets is performed in an infrastructure network topology.

16. The apparatus of claim 9, wherein more than two packets are sampled by said sampler and consolidated into a consolidated packet when the sum of said corresponding throughput times exceeds said predetermined limit.

* * * * *